Nov. 12, 1963  F. K. H. NALLINGER ET AL  3,110,883
HEADLIGHT ASSEMBLY FOR AUTOMOBILES
Filed March 11, 1958

INVENTORS
FRIEDRICH K.H. NALLINGER
KARL WILFERT
BY Dicke and Craig
ATTORNEYS

United States Patent Office 3,110,883
Patented Nov. 12, 1963

3,110,883
HEADLIGHT ASSEMBLY FOR AUTOMOBILES
Friedrich K. H. Nallinger, Stuttgart, and Karl Wilfert, Stuttgart-Degerloch, Germany, assignors to Daimler-Benz Aktiengesellschaft, Stuttgart-Untertürkheim, Germany
Filed Mar. 11, 1958, Ser. No. 720,789
Claims priority, application Germany Mar. 15, 1957
1 Claim. (Cl. 340—100)

The present invention relates to a headlight assembly, especially for motor vehicles, and more particularly relates to a unitary headlight assembly consisting of the headlight, a turn indicator and/or a parking light, a fog light, the horn, etc., which are usually arranged on opposite sides at the front end of the motor vehicle.

In particular, the present invention relates to a structural unit for a motor vehicle consisting of a headlight, a turn indicator for indicating the intended direction of the vehicle and possibly of further light sources and/or of other installations usually arranged at the front end of the vehicle.

With known installations of the prior art, the individual light sources are arranged vertically above each other on each side of the vehicle. As a result of such an arrangement, several disadvantages occur, for example, in that with modern relatively low bodies, the space at the front end of the vehicle no longer suffices in the vertical direction for sufficiently large light sources, in that the turn indicators are not visible from the side thereof and in that the turn indicators are not sufficiently distinguishable from the main headlights.

According to another prior art arrangement, two main headlights, one each being provided at each side of the passenger motor vehicle, are combined with a third headlight arranged at the same height in the center of the vehicle into a common structural unit to which, however, the turn indicators do not belong.

In contrast thereto, the present invention seeks to provide a practical solution, while maintaining the advantages of a self-contained structural unit, for an arrangement of the turn indicators and possibly also of further light sources and/or other installations normally found at the forward end of the vehicle with the main headlight of the respective vehicle side in which each of the parts which belongs to the structural unit is located to display and realize the most favorable position for its function without entailing the disadvantages of the known prior art units.

The present invention essentially consists in that the parts listed hereinbelow, insofar as they are present in the assembly, are arranged in the following manner with respect to the main headlight:

(a) The turn indicator is disposed essentially at the height of the main headlight laterally outside thereof whereby the transparent covering pane thereof is bent in a known manner around the side wall of the vehicle body so as to make the same visible also from the side of the vehicle;

(b) The fog light is disposed essentially below the main headlight;

(c) An air inlet aperture is disposed laterally inwardly adjacent the main headlight or possibly, if the fog light is omitted, also below the main headlight; and (d) The sheet-metal horn for the signalling device is disposed essentially below the main headlight or laterally inwardly thereof.

Accordingly, it is an object of the present invention to provide a unitary self-contained structural assembly for the various lights and other devices and installations usually found in front of the vehicle on each side thereof which avoids the disadvantages of the prior art.

Another object of the present invention is to provide a unitary structure for the headlight and turn indicator light in which the turn indicator light are clearly distinguishable from the main headlight and are so arranged as to also be visible from the side thereof.

Still another object of the present invention is to provide a unitary headlight assembly for each side of the motor vehicle front end in which each light and other installation finds its most favorable position.

These and other objects, features and advantages of the present invention will become more obvious from the following description when taken in connection with the accompanying drawing, which shows, for purposes of illustration only, several embodiments in accordance with the present invention, and wherein.

Figure 1:
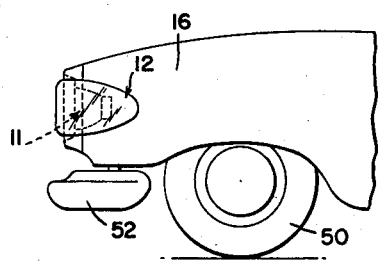
FIGURE 1 is a side view of a first embodiment of a unitary light assembly disposed at the forward corner of a passenger motor vehicle.
Figure 2:
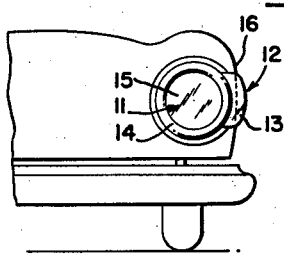
FIGURE 2 is a partial front view of the embodiment illustrated in FIGURE 1.

Referring now to the drawing, wherein like reference numerals are used throughout the various views to designate like parts, and more particulary to FIGURES 1 and 2 thereof, a unitary assembly consisting of a main headlight generally designated by reference numeral 11 and of a turn indicator light generally designated by reference numeral 12 for indicating the desired direction is provided at the forward end of the vehicle on each side of the vehicle ahead of the front wheels 50 and essentially above the front bumper 52, the side of the vehicle opposite that shown in FIGURES 1 and 2 being of mirror image-like construction.

According to the present invention, the turn indicator light 12 adjoins the main headlight 11 laterally thereof, and more particularly the covering disk or pane 13 for the turn indicator 12 adjoins the rim 14 for the covering pane 15 of the main headlight 11. The covering pane 13 of the turn indicator 12 which has approximately the same height as the covering pane 15 of the main headlight 11, is bent around into the side wall 16 of the vehicle body and decreases in dimension in the rearward direction thereof so that the turn indicator 12, as seen from the side thereof has a drop-shaped configuration (FIGURE 1).

Figure 3:
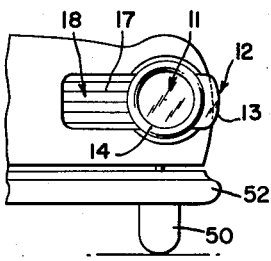
FIGURES 3 to 5 are partial front views of three further embodiments of unitary light assemblies similar to FIGURE 2 and showing modifications in the assembly thereof.

The embodiment according to FIGURE 3 distinguishes itself from the embodiment of FIGURES 1 and 2 only in that an air inlet aperture generally designated by reference numeral 18 for the fresh air supply serving the purpose of ventilating and heating the vehicle interior, belongs to the structural unit which is covered by a screen 17. The air inlet aperture 18 with the screen 17 thereof is arranged laterally inwardly of the main headlight 11 and is of essentially the same dimension in height as the covering pane 14 of the main headlight 11 so that the impression of a unitary horizontal structure results therefrom.

Figure 4:
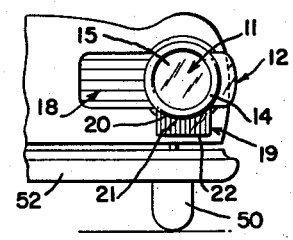

In the embodiment according to FIGURE 4, a fog light generally designated by reference numeral 19 additionally belongs to the light assembly. The upper boundary or limit line 20 of the covering pane 21 for the fog light 19 which adjoins the rim 14 of the covering 15 for the main headlight 11 is adapted to the curvature thereof, i.e., follows the curvature thereof, whereas the lower boundary or limit line 22 thereof extends essentially horizontally in a straight manner.

Figure 5:
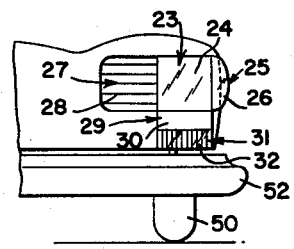

In the embodiment according to FIGURE 5, reference numeral 23 generally designates the main headlight, reference numeral 24 the covering pane thereof, reference numeral 25 generally designates the turn indicator light for indicating the intended direction of the vehicle, reference numeral 26 the covering pane thereof, reference numeral 27 generally designates the air inlet aperture for the fresh air serving to ventilate and heat the vehicle interior, reference numeral 28 the screen covering the same, reference numeral 29 generally designates the vehicle signalling device, reference numeral 30 the horn thereof, reference numeral 31 generally designates a fog light, and reference numeral 32 the covering pane thereof. As compared with the embodiment according to FIGURE 4, the unitary light assembly of FIGURE 5 is enlarged by the addition of the vehicle horn 29. The latter is arranged between the main headlight 23 and the fog light 31, whereby the covering pane 24 for the main headlight 23, the horn 30 for the vehicle signalling device 29 and the covering pane 32 for the fog light 31 are disposed vertically above each other and terminate laterally in the same vehicle longitudinal plane in the form of a rectangle. The turn indicator 25 and the air inlet aperture 27 are arranged as before laterally outside and inside, respectively, of the main headlight 23 so that the unitary assembly forms essentially the configuration of a T.

Different from the previous embodiments, however, is the absence of a separate rim for the covering pane 24 of the main headlight 23; consequently, the covering pane 26 of the turn indicator 25, the screen 28 of the air inlet aperture 27 and the horn 30 therefor directly adjoin the covering pane 24 for the main headlight 23.

Figure 6:
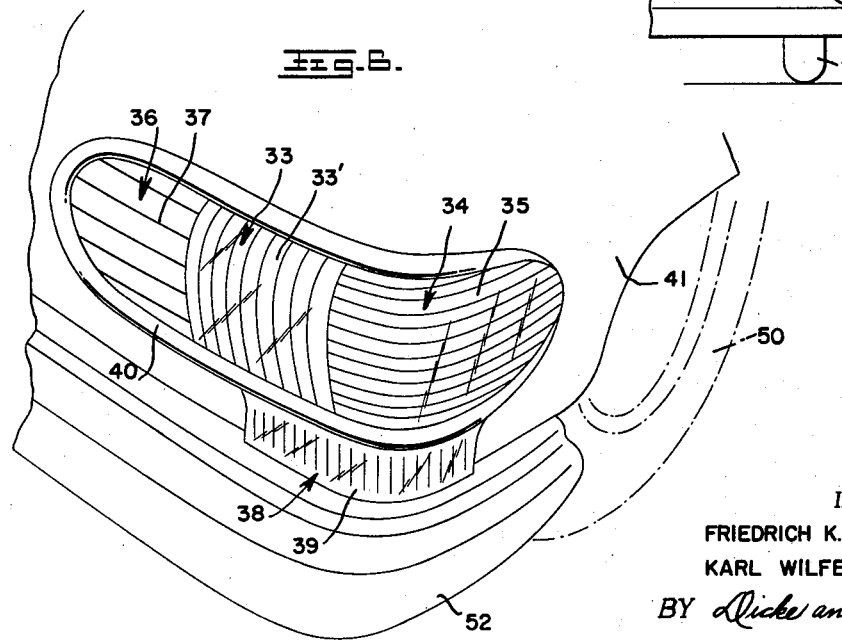
FIGURE 6 is a perspective view of fifth embodiment of a unitary light assembly for the forward corner of a passenger motor vehicle.

The embodiment illustrated in FIGURE 6 is similar to the embodiment of FIGURE 4. In this embodiment, the main headlight is generally designated by reference numeral 33, the covering pane thereof by reference numeral 33', the turn indicator for indicating the intended turn of the vehicle generally designated by reference numeral 34, the covering pane thereof by reference numeral 35, the air inlet aperture generally designated by reference numeral 36, which serves for purposes of supplying fresh air to the ventilating and heating system of the vehicle, the screen thereof by reference numeral 37, a fog light generally designated by reference numeral 38 and the covering pane thereof by reference numeral 39.

The embodiment of FIGURE 6 distinguishes itself from that of FIGURE 4, however, by the covering pane 33' for the main headlight 33, the covering pane 35 for the turn indicator 34, and the screen 37 for the air inlet aperture 36 which are all surrounded by a common rim 40, made for example, of chromed metal or stainless steel. The covering pane 39 for the fog light 38, which adjoins the assembly in the downward direction as well as the covering pane 35 for the turn indicator 34 are bent around the vehicle body into the lateral wall 41 thereof so as to be visible from the side.

The embodiments illustrated hereinabove show, as seen in their entirety, the structural units which may be organically installed into the forward portions of a motor vehicle constructed according to modern design principles.

While we have shown and described several embodiments in accordance with the present invention, it is understood that the same is not limited thereto but is susceptible of many changes and modifications within the spirit and scope of the present invention, and we, therefore, intend to cover all such changes and modifications as encompassed by the appended claim.

We claim:

A head lamp, turn signal, and ventilating assembly for use in a front fender of a motor vehicle comprising a turn signal lamp having a curved lens visible from both the front and side of the vehicle, a head lamp mounted beside the turn signal lamp and having a lens abutting the lens of the turn signal, an air inlet mounted beside the head lamp, all in horizontal alignment at the normal elevation of a motor vehicle headlight, the entire assembly forming a unitary structure, and the assembly being enclosed in a single rim for mounting in the front fender.

References Cited in the file of this patent

UNITED STATES PATENTS

| | | |
|---|---|---|
| D. 176,572 | Teague | Jan. 3, 1956 |
| 1,134,360 | Walker | Apr. 6, 1915 |
| 1,440,516 | Whitton | Jan. 2, 1923 |
| 2,549,124 | Oswald | Apr. 17, 1951 |
| 2,825,888 | Oldenberg | Mar. 4, 1958 |
| 2,883,654 | Bauer | Apr. 21, 1959 |
| 2,888,274 | Premo | May 26, 1959 |
| 2,940,064 | Wilfert | June 7, 1960 |

FOREIGN PATENTS

| | | |
|---|---|---|
| 475,536 | Italy | Nov. 3, 1952 |
| 1,089,855 | France | Oct. 6, 1954 |